United States Patent
Voss et al.

(10) Patent No.: US 8,567,721 B2
(45) Date of Patent: Oct. 29, 2013

(54) DECOMPRESSION DEVICE FOR AN AIRCRAFT

(75) Inventors: Jens Voss, Harsefeld (DE); Markus Horst, Bad Oldesloe (DE); Ingo Roth, Hamburg (DE)

(73) Assignee: Airbus Operations GmbH (DE)

( * ) Notice: Subject to any disclaimer, the term of this patent is extended or adjusted under 35 U.S.C. 154(b) by 213 days.

(21) Appl. No.: 12/693,847

(22) Filed: Jan. 26, 2010

(65) Prior Publication Data

US 2010/0187358 A1 Jul. 29, 2010

Related U.S. Application Data

(60) Provisional application No. 61/147,799, filed on Jan. 28, 2009.

(30) Foreign Application Priority Data

Jan. 28, 2009 (DE) .......................... 10 2009 006 395

(51) Int. Cl.
*B64D 13/04* (2006.01)

(52) U.S. Cl.
USPC .......................... 244/129.4; 244/118.5; 454/71

(58) Field of Classification Search
USPC ............. 244/118.5, 129.4, 129.1, 129.5, 119; 454/71–74, 76, 77
See application file for complete search history.

(56) References Cited

U.S. PATENT DOCUMENTS

| | | | |
|---|---|---|---|
| 4,646,993 A | 3/1987 | Baetke | |
| 4,703,908 A * | 11/1987 | Correge et al. | 244/118.5 |
| RE32,554 E | 12/1987 | Murphy | |
| 4,819,548 A * | 4/1989 | Horstman | 454/76 |
| 5,069,401 A | 12/1991 | Shepherd et al. | |
| 5,118,053 A | 6/1992 | Singh et al. | |
| 6,273,365 B1 | 8/2001 | Hiesener et al. | |
| 6,651,932 B2 | 11/2003 | Diehl et al. | |
| 2004/0172889 A1 | 9/2004 | Eijkelenberg et al. | |
| 2008/0302910 A1 * | 12/2008 | Calamvokis | 244/118.5 |
| 2009/0159748 A1 | 6/2009 | Treimer et al. | |

FOREIGN PATENT DOCUMENTS

| | | |
|---|---|---|
| DE | 10031714 A1 | 1/2002 |
| DE | 102004009017 B3 | 8/2005 |
| DE | 102007061433 A1 | 7/2009 |
| GB | 2072116 A | 9/1981 |
| RU | 2092742 C1 | 10/1997 |
| RU | 2140378 C1 | 10/1999 |
| RU | 2145564 C1 | 2/2000 |
| WO | 2007/073787 A1 | 7/2007 |

OTHER PUBLICATIONS

International Search Report—International Authority Application No. PCT/EP2006/009892, dated Jan. 23, 2007 together with the Written Opinion of the International Searching Authority.

* cited by examiner

*Primary Examiner* — Timothy D Collins
*Assistant Examiner* — Brian M O'Hara
(74) *Attorney, Agent, or Firm* — Lerner, David, Littenberg, Krumholz & Mentlik, LLP

(57) ABSTRACT

The invention relates to a cover panel for an aircraft, comprising a decompression opening that can be closed by a decompression flap that comprises a membrane, and a ventilation opening that is provided separately in the cover panel and that is permanently open. Furthermore, the invention relates to an aircraft fuselage comprising such a cover panel.

7 Claims, 4 Drawing Sheets

DECOMPRESSION DEVICE FOR AN AIRCRAFT

CROSS-REFERENCE TO RELATED APPLICATIONS

This application claims the benefit of the filing date of U.S. Provisional Patent Application No. 61/147,799 filed Jan. 28, 2009, the entire disclosure of which application is hereby incorporated herein by reference.

BACKGROUND OF THE INVENTION

The invention relates to a cover panel for an aircraft, comprising a decompression opening.

The fuselage of a normal passenger aircraft is divided into several regions, among others a passenger region and a cargo region. During cruise flights, the aircraft is surrounded by cold environmental conditions of low air pressure, which requires air conditioning and pressurisation of the aircraft fuselage. For this purpose, bleed air from the engines is normally introduced into the passenger cabin, which bleed air, when it has passed through the passenger region, can escape from the passenger region through ventilation openings that have been placed in the cover panels such that they are positioned in the area of the passenger foot space. Should the case arise where the fuselage is torn open or is connected to the environment of the aircraft, for example by way of a defective cargo compartment door, as a result of the large pressure differential between the ambient air of the aircraft fuselage and the interior region of the aircraft fuselage, which region is directly behind the opening that has arisen, air from this region escapes to the outside until finally in the region behind the opening that has arise, the pressure is similar to the ambient pressure of the aircraft. If for example the cargo compartment is the affected region, then as a result of the escaped air there is a large pressure differential between the passenger region and the cargo region that is separated from it. This would result in the cabin floor that separates the passenger region from the cargo region being subjected to large forces that might lead to damage to the cabin floor and thus to damage of air-safety-relevant system elements and structure elements.

For the purpose of bringing about rapid pressure compensation in such a case, so called decompression flaps are provided between the passenger region and the cargo region, which flaps in the case of a fast drop in pressure within the cargo region (or in some other region) open up and provide a flow path with an enlarged cross section.

Such a decompression flap arrangement is, for example, disclosed in WO 2007/073787 A1. However, this decompression device is associated with a disadvantage in that its design is relatively complex, which in turn results in greater weight, more expensive production, and high maintenance expenditure for the aircraft operator.

BRIEF SUMMARY OF THE INVENTION

The invention may provide a more simply designed device for quick pressure compensation and for air circulation between different regions of an aircraft fuselage.

An exemplary embodiment of the invention is based on the generic state of the art, by means of a cover panel for an aircraft, comprising a decompression opening that can be closed or covered by a decompression flap that comprises a membrane, and a ventilation opening that is provided separately in the cover panel and that is permanently open. Such a design may provide an advantage in that as a result of the provision of separate openings for ventilation and for decompression the flap mechanism requires less installation depth, and consequently installation space can be saved. This saved installation space can be utilised either to enlarge the flow cross section in the region between the exterior skin of the aircraft fuselage and the cover panel, or to enlarge the passenger region. This design furthermore makes it possible to omit the dual flap mechanism so that the design is less complex and the device can be produced, installed an maintained more economically. Furthermore, the simpler design saves weight. By providing the decompression flap with a membrane it is possible to reliably ensure that pressure differential on both sides of the decompression flap causes the membrane to bulge towards the side of less pressure, and finally, when a particular pressure differential has been reached, unlocks the decompression flap, lifts it from the cover panel, and thus opens the decompression opening to compensate for a large pressure differential between the passenger region and a region of lower pressure. The simple design results in a further advantage in that improved reliability can be achieved and the system is of a more low-maintenance nature. It should be pointed out that the term "ventilation opening" does not necessarily refer to an opening that is open continuously, but can also refer to an opening that is divided into several functionally-connected smaller openings, for example by means of a grille.

According to a further embodiment it may be provided for the ventilation opening to comprise a grille. This may be advantageous with respect to noise development during the ventilation of the air for air conditioning. Furthermore, this creates a barrier for objects that might otherwise be lost by passengers and might end up in the ventilation opening. With an elongated design of the grille elements situated in the airstream, when viewed in the direction of the airflow, with corresponding alignment, i.e. a corresponding angle relative to the direction of flow of the air passing through, the airflow resistance of the cabin air can be defined such that even and homogeneous flow behaviour of the outgoing air may be ensured in the entire cabin region.

Furthermore, it can be provided for the decompression flap to comprise a hollow space that on the side of the passenger cabin is delimited by a cover, and on the side facing in the opposite direction is delimited by the membrane. Thus on the one hand a flat and visually inconspicuous decompression flap surface on the side of the passenger cabin, and on the other hand a membrane for opening the decompression flap on that side of the decompression flap that faces away from the passenger cabin can be provided.

Furthermore, according to an exemplary embodiment, the cover panel can be designed such that the decompression flap comprises at least one initiation opening that makes possible an initial airstream into the hollow space. This initial airstream causes the membrane to deform, thus resulting in associated unlocking of the decompression flap.

Advantageously it can furthermore be provided for the decompression flap at one end to be connected to the cover panel by way of at least one hinge, and at the opposite end to be able to be coupled to the cover panel by means of at least one locking element. In this way a defined opening behaviour of the decompression flap may be guaranteed.

According to a further exemplary embodiment, on the side of the decompression panel the locking element is attached to the membrane, and as a result of deformation of the membrane can be decoupled from the locking element that is provided on the cover panel. This low-maintenance and simple designed mechanism that is thus economical may ensure reliable unlocking of the decompression flap.

The invention further comprises an aircraft fuselage with a cover panel according to the invention, wherein the decompression opening and the ventilation opening connect a passenger region of the aircraft fuselage with a region that is created between the exterior skin of the fuselage and the cover panel. This aircraft fuselage may provide the same advantages as does the cover panel according to the invention.

Below, embodiments of the invention are described with reference to the figures.

DETAILED DESCRIPTION

Figure 1:
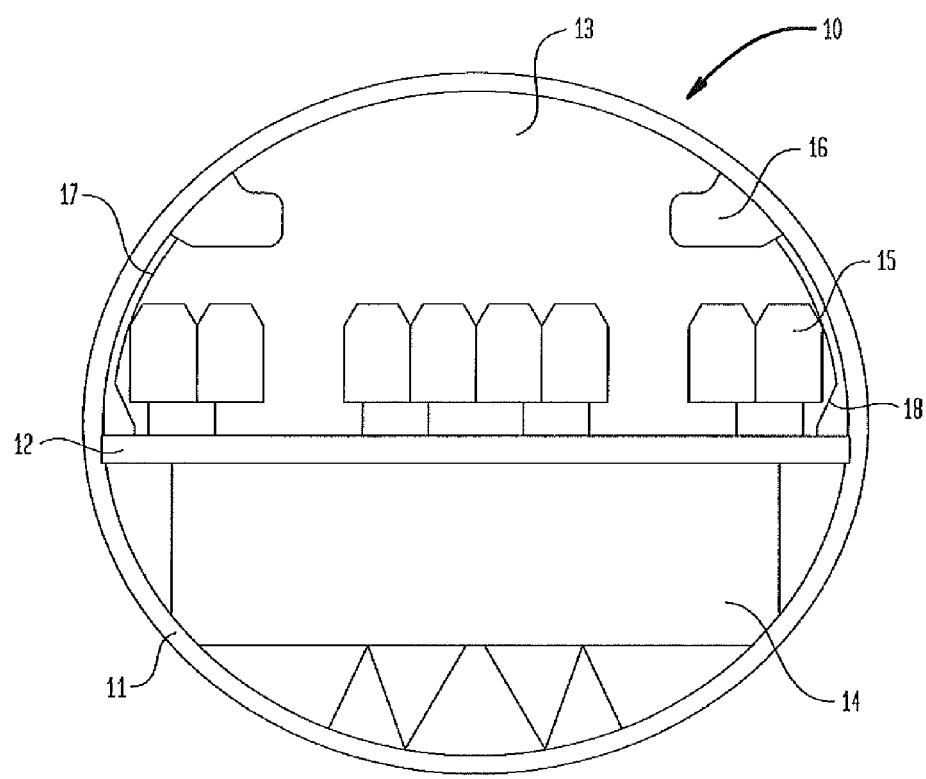
FIG. 1 shows a cross section of an aircraft fuselage.

FIG. 1 shows a cross section of an aircraft fuselage. This aircraft fuselage 10 is delimited by the exterior skin 11 of the fuselage, within which various regions that are separate of each other are formed. For example, a passenger region 13 is separated from a cargo region 14 by means of a cabin floor 12. In the passenger region 13, passenger seats 15 with hatracks 16 arranged overhead are provided. On the inside of the exterior skin 11 of the fuselage the passenger region 13 is lined with lateral cover panels 17 and, between the outer passenger seats and the exterior skin 11 of the fuselage in the region of the foot space, with cover panels 18, also referred to as dado panels.

Figure 2:
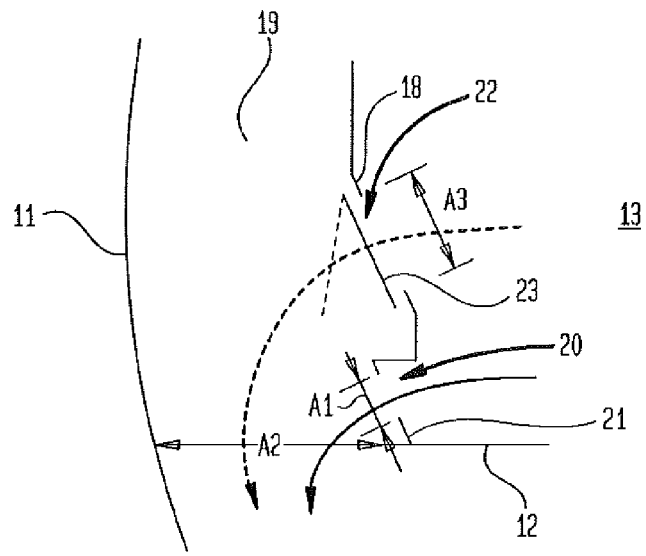
FIG. 2 schematically shows a cover panel with the decompression device according to the invention.

FIG. 2 diagrammatically shows a cover panel 18 with the decompression device according to the invention. As apparent from the illustration, a flow passage 19 is formed between the exterior skin 11 of the fuselage and the cover panel 18, which flow passage 19 makes it possible for air to pass between the passenger region 13 and other regions within the aircraft fuselage 10, which regions are separate thereof, preferably the cargo region 14. In the cover panel 18 a ventilation opening 20 is provided. This is an opening that is provided at the cabin floor side end of the cover panel 18, and is either completely delimited by material of the cover panel 18, or the material of the cover panel 18 in the region of the ventilation opening 20 only extends to the latter's upper delimitation so that the ventilation opening is open on the cabin floor side and/or laterally (at the front/rear when viewed in longitudinal direction of the aircraft). The ventilation opening 20 is permanently open, wherein, however, in order to avoid noise transmission into the passenger region 13 a labyrinth 21 is provided between the flow passage 19 and the ventilation opening 20, i.e. the ventilation opening 20 comprises a labyrinth 21 on the flow passage side. This labyrinth 21 is designed such that it hinders the through-flow as little as possible while retaining as well as possible the sound waves that are due to noise generation. In the present invention this is implemented by a labyrinth 21 that is designed as a wall, which extends transversely upwards so as to be inclined relative to the exterior skin 11 of the fuselage, and at the height of the top edge of the ventilation opening 20 extends horizontally, wherein in the centre an opening is provided. Above the ventilation opening 20 there is a decompression opening 22 formed in the cover panel 18, which decompression opening 22 in normal operation of the aircraft is closed by a decompression flap 23. In case of a pressure differential increase between the regions that are connected by the flow passage 19 as described above, the decompression flap 23 opens up, as shown in FIG. 2 by a dashed line, in order to increase the existing flow cross section for fast pressure compensation.

In normal operation the air is conveyed to the passenger region 13 by way of the aircraft's air conditioning system (not shown), which after flowing through the passenger region 13 escapes from the passenger region 13 at least in part by way of the ventilation opening 20, first into the flow passage 19. The flow passage 19 conveys the airflow further into other regions of the aircraft fuselage 10, in particular into the cargo region 14, until the airstream finally is partly fed back to the aircraft's air conditioning system or is released outside by way of valves that are arranged in the lower region of the aircraft fuselage 10. The flow path that is relevant in this operating state is designated in FIG. 2 by the solid-line arrow. In this arrangement the flow cross section A1 of the ventilation opening 20 or of the labyrinth 21, depending on which cross section is smaller, represents the delimitation for circulated air, because this flow cross section is smaller than cross section A2, i.e. the cross section of the flow passage 19 directly upstream of the ventilation opening 20. In the case of a considerable drop in pressure in the cargo region 14 and the associated great pressure differential between the passenger region 13 and the cargo region 14, the flow cross section A1 is, however, too small; it would excessively limit any pressure compensation between the passenger region 13 and the cargo region 14. In this case the decompression flap 23 is opened to the exterior skin 11 of the fuselage, and opens up the decompression opening 22 with the cross section A3 so that in the case of decompression a larger flow cross section is provided for the arising airflow, which in FIG. 2 is designated by dashed arrows. The airflow for pressure compensation is thus delimited by the sum of the cross sections A1 and A3 or the cross section A2 depending on which value is the lesser. Ideally the cross sections are designed so that the first-mentioned sum corresponds to the cross section A2. Thus, in this system, the decompression flap 23 is directly connected to the cover panel 18 by way of locking arrangements or hinges that are explained below, and is thus integrated in the cover panel 18. Above, a single decompression opening 22 or ventilation opening 20 was described as an example; it should, however, be mentioned that distributed over the aircraft fuselage 10 a plurality of such elements are arranged to which this description also applies.

Figure 3:
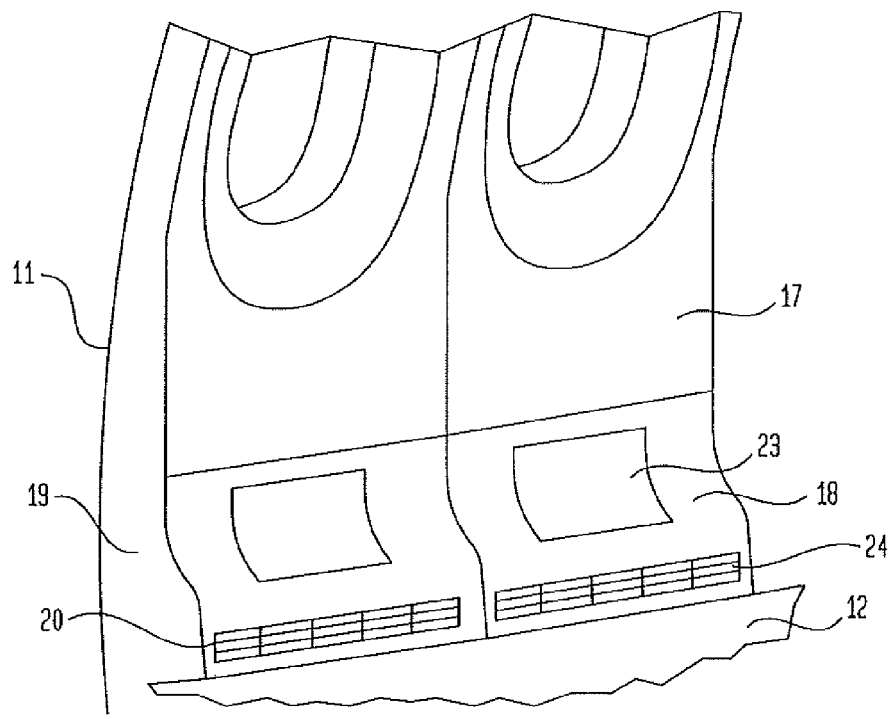
FIG. 3 shows a three-dimensional view of the decompression air-circulation combination.

FIG. 3 is a three-dimensional view of the decompression/air circulation combination. In contrast to the above embodiment, in this embodiment the ventilation opening 20 comprises a grille 24. This grille 24 is used as a visual barrier, as a barrier for objects and as a noise protection device for reducing noise transmission into the passenger region 13.

Figure 4A:
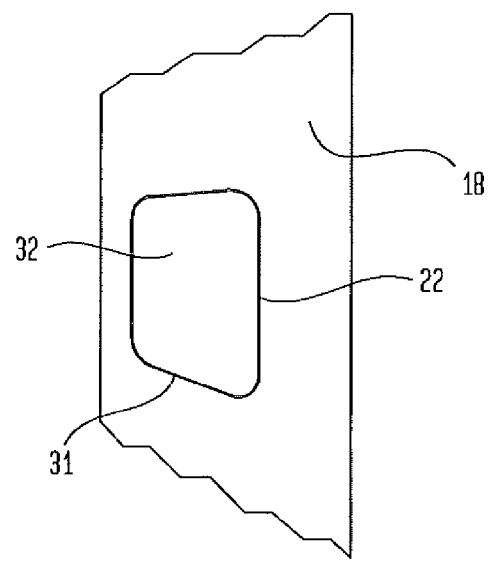
FIG. 4a shows the side of the cover panel that faces the passenger region, and the decompression flap connected thereto.
Figure 4B:
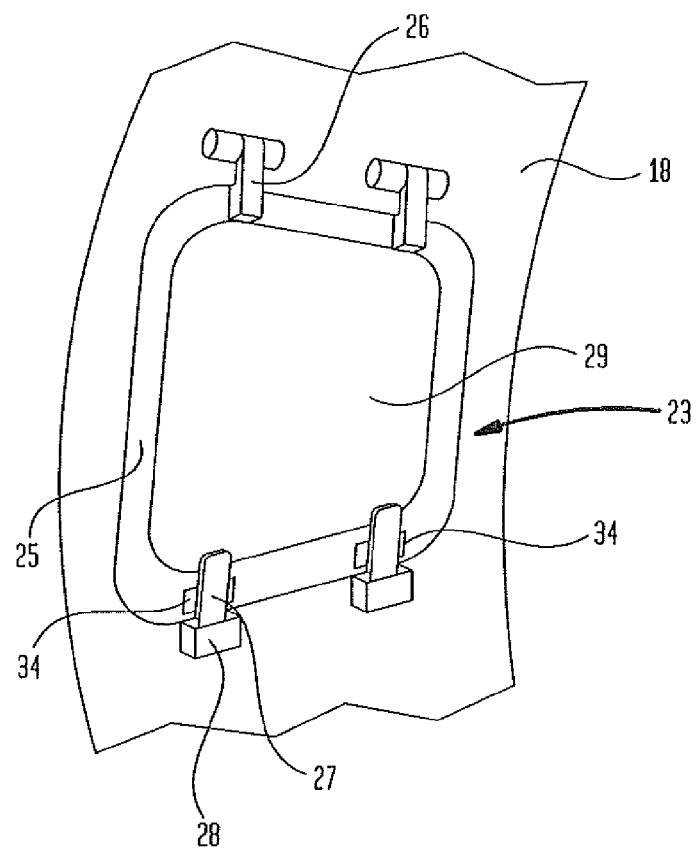
FIG. 4b shows the side of the cover panel that faces the exterior skin of the fuselage, with the decompression flap connected thereto in its closed state.
Figure 4C:
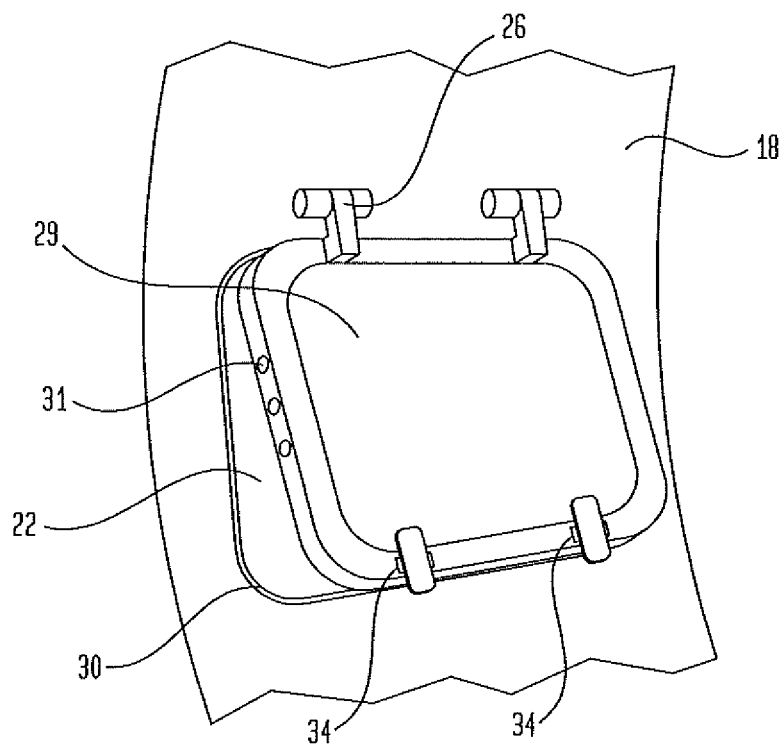
FIG. 4c shows the side of the cover panel that faces the exterior skin of the fuselage, with the decompression flap connected thereto in its open state.
Figure 4D:
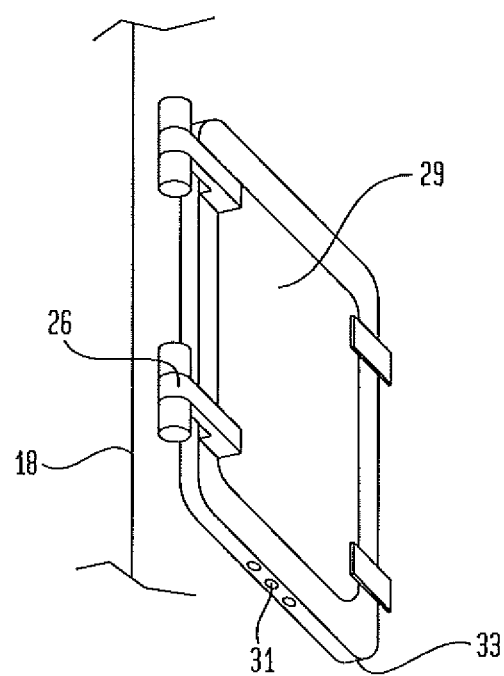
FIG. 4d shows the side of the cover panel that faces the exterior skin of the fuselage, with the decompression flap connected thereto in its open state.

FIG. 4a shows that side of the cover panel 18 that faces the passenger region 13, while FIGS. 4b to 4d show that side of the cover panel 18 that faces the exterior skin 11 of the fuselage, including the decompression flap 23 connected to it.

The decompression flap 23 comprises a rigid frame 25, which on the cabin side comprises a rigid cover 32. The cover 32 and the frame 25 are preferably designed in one piece, wherein this single-piece component is substantially thicker in the border region (perpendicular to the decompression flap 23) than it is in the remaining region. On the flow passage side an elastic membrane 29 is tensioned over the frame 25, which membrane 29 is either completely impermeable or partly impermeable to gases. In the present embodiment, the membrane 29 is impermeable. Thus a hollow space forms within (i.e. radially within) the frame 25, which on the cabin side is delimited by the cover 32, and on the flow passage side is delimited by the membrane 29. Furthermore, as shown in FIG. 4d, the frame 25 comprises a flange 33. On the flow passage side, this flange 33 protrudes, in a plane parallel to the plane of the decompression flap 23, from the remaining frame 25.

The flange 33 is either designed in a single piece with the frame 25, or the flange 33 is formed in that a frame with a larger circumference and thinner material thickness when compared to that of the frame 25 is screwed onto said frame 25 on the flow passage side. In this arrangement a border of the membrane 29 is squeezed between the frames screwed together. If the frame 25 is designed so as to be a single part, the membrane 29 can, for example, also be connected to the frame 25 by way of an adhesive connection. The membrane 29 is thus connected to the frame 25 in an airtight manner. As shown in FIG. 4a, on the cabin side the decompression flap 25 is visually flush with the cover panel 18 and therefore perceptible by passengers only as a result of its small circumferential groove.

Between the flange 33 and the cover panel 18 a seal 30 is provided (i.e. in the closed state of the decompression flap 23), which is preferably connected to the cover panel 18. Laterally the frame 25 comprises initiation openings 31, which establish a connection to the hollow space between the cover 32 and the membrane 29. The elastic seal 30 seals the gap between the cover panel 18 and the flange 33 on the flow passage side of the initiation openings 31 so that a permanently open connection with a small cross section is created between the passenger region 13 and the hollow space between the cover 32 and the membrane 29.

On one end, in the present exemplary embodiment at the top (at the end pointing away from the cabin floor 12), the frame 25 is connected to the cover panel 18 by way of hinges 26. At the opposite end, locking elements 27 are connected to the membrane 29, which locking elements 27 can be made to engage locking elements 28, for example a locking bolt or pin provided on the membrane 29, which locking bolt or pin engages an engagement element provided on the cover panel. The locking elements 27 that are connected to the membrane 29 are fed through guide elements 34 attached to the frame 25, which guide elements 34 are provided laterally (in relation to their longitudinal direction) of the locking elements 27 or completely encompass said locking elements 27.

In normal operation, i.e. with normal air conditioning of the aircraft without a drop in pressure within the aircraft fuselage 10, the decompression flap 23 is closed, as shown in FIGS. 4a and 4b. If there is a drop in pressure, for example as a result of an open cargo compartment door in the cargo region 14, a pressure differential arises between the cargo region 14 and the passenger region 13. This increased pressure differential, when compared to the normal state, results in an increased airflow through the ventilation opening 20. Furthermore, as a result of the increased pressure differential between the passenger cabin 13 and the flow passage 19, air flows from the passenger cabin 13 by way of the initiation openings 31 into the hollow space between the cover 32 and the membrane 29 so that the membrane 29 deforms, i.e. bulges, in the direction of the exterior skin 11 of the fuselage, and is virtually inflated. Such deformation of the membrane 29 results in the locking elements 27 being moved upwards, in the direction of the hinges 26, thus detaching from the locking elements 28 provided on the cover panel 18. In this way the entire decompression flap 23 is opened and swung towards the exterior skin 11 of the fuselage. The decompression opening 22 is thus opened, and consequently the required additional flow cross section A3 is provided. The pressure differential that acts on the area of the membrane 29 is explained by the airtight closure of the membrane 29 and the decompression flap 23, as well as by the seal 30 between the decompression flap 23 and the cover panel 18.

In addition, it should be noted that features or steps which have been described with reference to one of the above further developments can also be used in combination with other features or steps of other further developments described above.

The invention claimed is:

1. A cover panel for arrangement between a passenger region and an outer skin of an aircraft, the cover panel comprising:
    a decompression opening configured to be closed by a decompression flap comprising an elastic membrane, and
    a permanently open ventilation opening provided separately in the cover panel;
    wherein the decompression flap comprises a hollow space delimited by a cover on a cabin side, a frame around a border region, and by the elastic membrane on a side facing opposite of the cabin side;
    wherein the frame comprises at least one opening defined in the frame;
    wherein the at least one opening provides fluid communication between the passenger region and the hollow space; and
    wherein the frame is connected to the cover panel by way of at least one hinge.

2. The cover panel of claim 1, wherein the ventilation opening comprises a grille.

3. The cover panel of claim 1, wherein the at least one opening is configured to allow an initial airstream from the passenger region into the hollow space.

4. The cover panel of claim 1, further comprising a seal provided between the decompression flap and the cover panel.

5. The cover panel of claim 1, wherein the decompression flap is configured to be coupled to the cover panel by at least one locking element at an end opposite from the at least one hinge.

6. The cover panel of claim 5, wherein on a decompression flap side, the at least one locking element is attached to the membrane, and as a result of deformation of the membrane, the at least one locking element is configured to be decoupled from a locking element provided on the cover panel.

7. An aircraft fuselage with a cover panel arranged between a passenger region and an outer skin of the aircraft, said cover panel comprising:
    a decompression opening configured to be closed by a decompression flap comprising an elastic membrane, and
    a ventilation opening provided separately in the cover panel and configured to be permanently open,
    wherein the decompression opening and the ventilation opening connect a passenger region of the aircraft fuselage with a region created between the exterior skin of the fuselage and the cover panel;

wherein the decompression flap comprises a hollow space delimited by a cover on a cabin side, a frame around a border region, and by the elastic membrane on a side facing opposite of the cabin side;

wherein the frame comprises at least one opening defined in the frame;

wherein the at least one opening provides providing fluid communication between the passenger region and the hollow space; and wherein the frame is connected to the cover panel by way of at least one hinge.

\* \* \* \* \*